(12) United States Patent
Leibman

(10) Patent No.: US 6,238,156 B1
(45) Date of Patent: May 29, 2001

(54) TUBE ASSEMBLY DEVICE

(75) Inventor: Bernard Leibman, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/434,929

(22) Filed: Nov. 5, 1999

(51) Int. Cl.⁷ .................................................. F16B 21/07
(52) U.S. Cl. .......................... 411/182; 411/508; 411/913; 403/280
(58) Field of Search ................... 403/187, 188, 403/192, 193, 200, 231, 256, 258, 260, 247, 249, 251, 252, 280; 411/182, 508, 509, 913, 176, 178, 179, 180; 138/89; 248/251

(56) References Cited

U.S. PATENT DOCUMENTS

| | | | |
|---|---|---|---|
| 2,618,009 | * 11/1952 | Tinnerman | 403/280 |
| 2,654,620 | * 10/1953 | Tinnerman | 411/176 |
| 3,633,862 | * 1/1972 | Breen | 248/251 |
| 3,869,760 | * 3/1975 | Meyer | 411/182 |
| 4,317,471 | 3/1982 | King, Sr. . | |
| 4,518,293 | * 5/1985 | Pleickhardt et al. | 411/182 |
| 4,810,144 | * 3/1989 | Martelli | 411/182 |
| 5,291,897 | 3/1994 | Gastrin et al. . | |
| 5,310,298 | * 5/1994 | Hwang | 411/182 |
| 5,388,666 | 2/1995 | Schworer . | |
| 5,496,076 | 3/1996 | Lin . | |
| 5,503,492 | * 4/1996 | Stevens et al. | 411/182 |
| 5,713,130 | 2/1998 | Fukuda et al. . | |

* cited by examiner

*Primary Examiner*—Lynne H. Browne
*Assistant Examiner*—W. Doug Hutton
(74) *Attorney, Agent, or Firm*—John M. Kelly; David E. Henn

(57) ABSTRACT

A device for mounting tubular members to structural members. The device is a unitary structure formed into two gripping arms, two flex arms and a retainer plate. Each gripping arm includes a bend and two pointed straight protrusions. Each flex arm includes two pointed bent protrusions and a stop having a bent lip. The retainer plate includes an opening for engaging a threaded member.

7 Claims, 3 Drawing Sheets

TUBE ASSEMBLY DEVICE

FIELD OF THE INVENTION

This invention relates to a device for connecting a tube to a structural member.

BACKGROUND OF THE INVENTION

Mechanical structures, for example machine frames, are frequently comprised of tubes connected to other structural members, such as plates or other tubes. As an example, electrophotographic printing machines typically have machine frames that hold and support door panels, glass platens, finishing devices, and electrophotographic processing stations. Such machine frames often include a framework of interconnected tubes. To reduce weight and cost, the interconnected tubes are often comprised of aluminum or plastic.

Connecting tubes to other structural members is often performed by welding, brazing, soldering or chemical bonding, techniques that can be difficult, time consuming, expensive and/or dangerous. Furthermore, such techniques can interfere with production processes that require rapid product customization or production performed by workers with relatively low technical skills. Therefore, a new device for assembly structures having tubular members would be beneficial.

SUMMARY OF THE INVENTION

The principles of the present invention provide for a device for mounting tubular members to structural members. A device according to the principles of the present invention is a unitary structure formed into two gripping arms, two flex arms and a retainer plate. Each gripping arm includes a stress-relief bend and two pointed straight protrusions. Each flex arm includes two pointed bent protrusions and a stop having a bent lip. The retainer plate includes a fitting for engaging a threaded member.

BRIEF DESCRIPTION OF THE DRAWINGS

The invention will be described in detail herein with reference to the following figures in which like reference numerals denote like elements and wherein.

DETAILED DESCRIPTION OF A PREFERRED EMBODIMENT OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
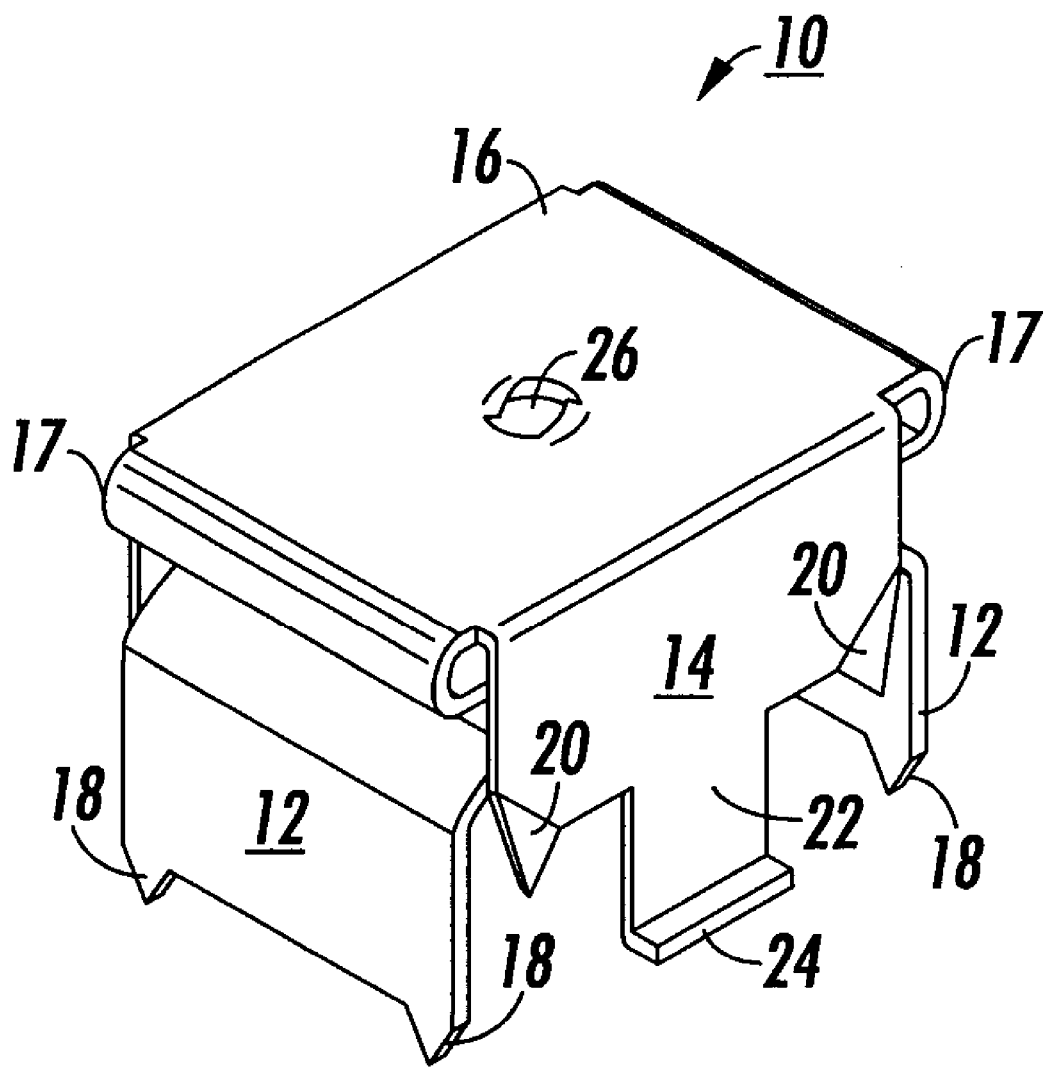
FIG. 1 is a perspective view of a device for mounting tubular members to structural members that is in accord with the principles of the present invention.
Figure 2:
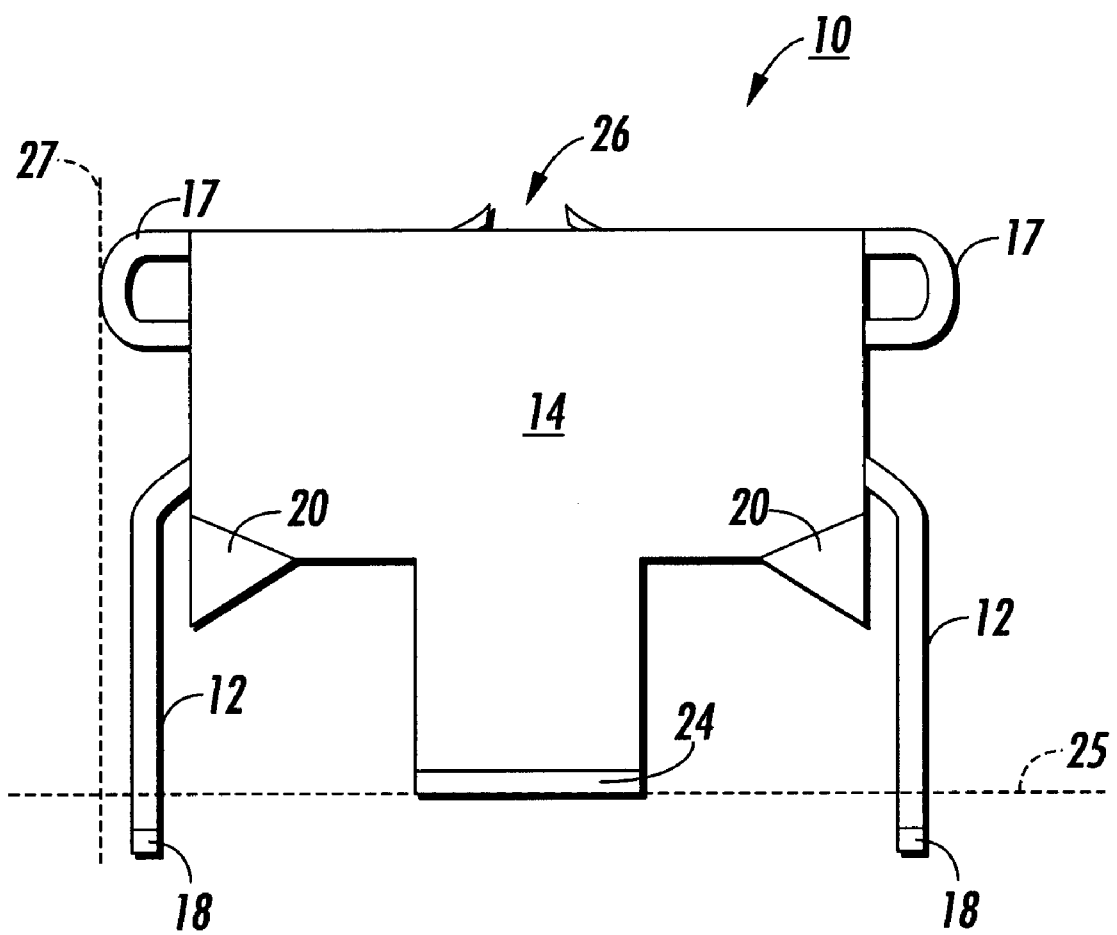
FIG. 2 is a plan view of the device illustrated in FIG. 1.

FIGS. 1 and 2 illustrate a device 10 that is designed to mount tubular members to structural members. That device includes two gripping arms 12, two flex arms 14 (only one of which is shown in FIG. 1), and a retainer plate 16. Each gripping arm includes a stress-relief bend 17 and two pointed straight protrusions 18. Each flex arm includes two pointed bent protrusions 20 and a stop 22 having a bent lip 24. The retainer plate 16 includes a fitting 26 that mates with a threaded element, such as a bolt, machine screw or self-tapping screw.

As shown most clearly in FIG. 2, the ends of the pointed straight protrusions 18 extend slightly below the bottom 25 of the bent lip 24. It should be noted that in FIG. 2 the extent of the distance between the ends of the pointed straight protrusions and the bottom of the bent lip is exaggerated. In practice this distance should be relatively small. Additionally, the maximum extent 27 of the stress-relief bend 17 is further from the center of the device 10 then the remainder of the gripping arm 12.

Figure 3:
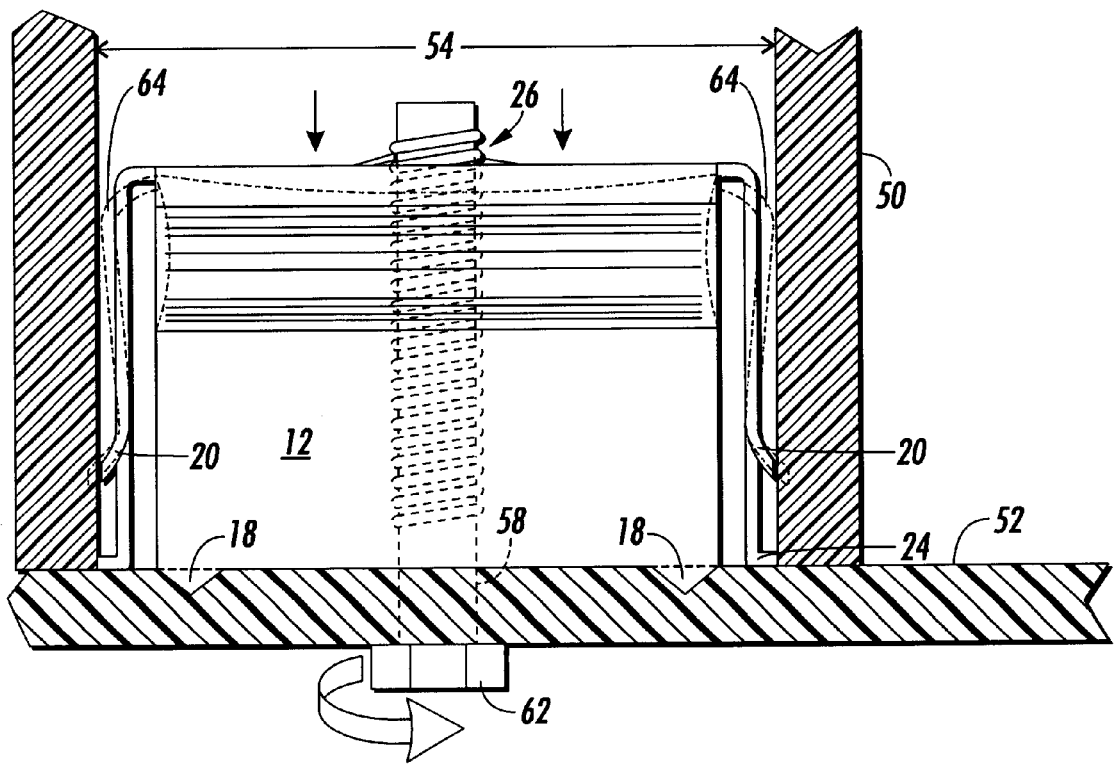
FIG. 3 is a plan view of the device illustrated in FIG. 1 connecting adjacent tubes together.

FIG. 3 illustrates the device 10 retaining a square tube 50 having an inner dimension 54 to a structural member 52 (which may be the wall of another tube). Referring now also to FIG. 2, the outer surfaces of the stress-relief bends 17 are dimensioned to fit into the tube 50. To use the device 10 the device is pushed into the tube 50 such that the bottoms of the pointed straight protrusions 18 are slightly within the tube. The center of the tube is then placed over an opening 58 through the structural member 52. A bolt 62 is passed through the opening and threaded into the fitting 26. As the bolt is turned, the device is pulled closer to the structural member 52. When the pointed straight protrusions 18 contact the structural member 52, those protrusions dig into that member. This stops the device 10 from turning within the tube 50 when the torque increases. As the bolt continues to turn, the stress-relief bend 17 begins flexing, thus biasing the retaining plate 16 towards the structural member 52. As the bolt continues to turn, the bottom of the lip 24 contacts the structural member 52. This stops the bottom of the device from moving further. As the bolt continues to turn the top of the retaining plate is pulled toward the structural member. This flexes the retaining plate, pushing the top 64 of the flex arm into contact with a side wall of the tube. With the top in contact with the side wall, additional turning of the bolt 62 causes the flex arm to begin flexing such that the bent protrusions 20 move toward the side walls of the tube. As turning continues, the bent protrusions 20 dig into the side walls. The tube 50 is then securely attached to the structural member 52.

The device is beneficially unitary, that is, the device is formed from one piece of material. Beneficially, that material is sheet metal, preferably steel. Even more beneficially, that sheet metal has spring-like characteristics in that the flex walls act as springs when the bolt is tightened. Additionally, the device is best used with a relatively soft tube, such as plastic or aluminum. Finally, the end of the tube might include an internal lip that mates with the bent lip 24 so as to prevent the device 10 from going too far into the tube 50.

Manufacture of the device 10 is relatively straight forward. A blank device is punched from a flat piece of sheet metal. That blank should include the pointed protrusions, stop, and an opening in the retainer plate. The stress-relief bends 17 are then formed to complete the gripping arms 12. The bent protrusions 20 are then pushed out and the bent lips 24 are then formed. The flex arms are then bent into position. The fitting is then threaded or bent into its final form to mate with the threaded member. Tempering the device to impart spring-like characteristics completes the device.

While this invention has been described in conjunction with various embodiments, it is evident that many alternatives, modifications, and variations will be apparent to those skilled in the art. For example, the fitting 26 could be a speed nut, Tinnerman nut, or threaded opening. Accordingly, it is intended to embrace all such alternatives, modifications, and variations as fall within the spirit and broad scope of the appended claims.

What is claimed is:

1. A device for mounting a tubular member to a structural member using a threaded member, said device being a unitary structure formed with two gripping arms, two flex arms and a retainer plate, wherein each gripping arm includes a bend and two pointed straight protrusions for engaging the structural member, wherein each flex arm includes two pointed bent protrusions for engaging an inner wall of the tubular member and a stop having a bent lip for contacting the structural member, and wherein said retainer plate includes a fitting for engaging the threaded member that passes through the structural member.

2. A device according to claim 1, wherein said device comprises sheet metal.

3. A device according to claim 2, wherein said sheet metal is a steel.

4. A device according to claim 1, wherein said bent lip limits the advancement of said device toward the structural member when the threaded member is turned.

5. A device according to claim 1, wherein each of said flex arms act as a spring.

6. A device according to claim 1, wherein said fitting mates with a self-tapping screw.

7. A device according to claim 1, wherein said fitting mates with a bolt.

* * * * *